US011620353B2

(12) United States Patent
Anders et al.

(10) Patent No.: US 11,620,353 B2
(45) Date of Patent: Apr. 4, 2023

(54) HYPERLINK VISUAL INDICATOR

(71) Applicant: INTERNATIONAL BUSINESS MACHINES CORPORATION, Armonk, NY (US)

(72) Inventors: Kelley L. Anders, East New Market, MD (US); Christian B. Compton, Austin, TX (US); Jeremy R. Fox, Georgetown, TX (US); Trudy L. Hewitt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 529 days.

(21) Appl. No.: 16/002,128

(22) Filed: Jun. 7, 2018

(65) Prior Publication Data

US 2019/0377829 A1    Dec. 12, 2019

(51) Int. Cl.
*G06F 16/955* (2019.01)
*G06F 16/951* (2019.01)

(52) U.S. Cl.
CPC ........ *G06F 16/9558* (2019.01); *G06F 16/951* (2019.01)

(58) Field of Classification Search
None
See application file for complete search history.

(56) References Cited

U.S. PATENT DOCUMENTS

| | | | |
|---|---|---|---|
| 6,037,935 A | 3/2000 | Bates et al. | |
| 6,052,486 A | 4/2000 | Knowlton et al. | |
| 7,634,543 B1 * | 12/2009 | Van Zant | G06Q 10/107 709/206 |
| 7,975,238 B2 | 7/2011 | Keohane et al. | |
| 9,509,644 B2 | 11/2016 | Szeto | |
| 2007/0208751 A1 | 9/2007 | Cowan et al. | |
| 2008/0168065 A1 | 7/2008 | Kanevsky et al. | |
| 2008/0195674 A1 * | 8/2008 | Kim | G06F 16/957 |
| 2014/0258968 A1 | 9/2014 | Brown et al. | |
| 2015/0193390 A1 * | 7/2015 | Stekkelpak | G06F 16/9558 715/207 |
| 2016/0034642 A1 * | 2/2016 | Ehrhart | G16H 10/60 705/3 |

OTHER PUBLICATIONS

Mell et al., "The NIST Definition of Cloud Computing," National Institute of Standards and Technology, Sep. 2011, p. 1-3, Special Publication 800-145.

* cited by examiner

*Primary Examiner* — Thu N Nguyen
(74) *Attorney, Agent, or Firm* — Rakesh Roy

(57) ABSTRACT

A method, computer system, and a computer program product for indicating a hyperlink record is provided. The present invention may include receiving a hyperlink. The present invention may also include searching a data structure including a repository of a plurality of hyperlinks stored in at least one user system, where each hyperlink in the repository of the plurality of hyperlinks includes a hyperlink record having at least one reference to the at least one user system. The present invention may then include identifying a record of the received hyperlink in the searched data structure. The present invention may further include, in response to identifying the record of the received hyperlink within the searched data structure, modifying the received hyperlink to indicate the at least one reference to the at least one user system.

20 Claims, 5 Drawing Sheets

HYPERLINK VISUAL INDICATOR

BACKGROUND

The present invention relates generally to the field of computing, and more particularly to data management.

Communication, collaboration, and content sharing are important aspects of today's interconnected world. As users receive and share large volumes of data content, users may experience increasing difficulty with recalling if a given content was previously viewed, bookmarked, and/or saved. The inability of a user to recall prior engagement with the given content may lead to redundant storage of duplicate data and increased data storage costs across the user's system(s).

SUMMARY

Embodiments of the present invention disclose a method, computer system, and a computer program product for indicating a hyperlink record. The present invention may include receiving a hyperlink. The present invention may also include searching a data structure including a repository of a plurality of hyperlinks stored in at least one user system, where each hyperlink in the repository of the plurality of hyperlinks includes a hyperlink record having at least one reference to the at least one user system. The present invention may then include identifying a record of the received hyperlink in the searched data structure. The present invention may further include, in response to identifying the record of the received hyperlink within the searched data structure, modifying the received hyperlink to indicate the at least one reference to the at least one user system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
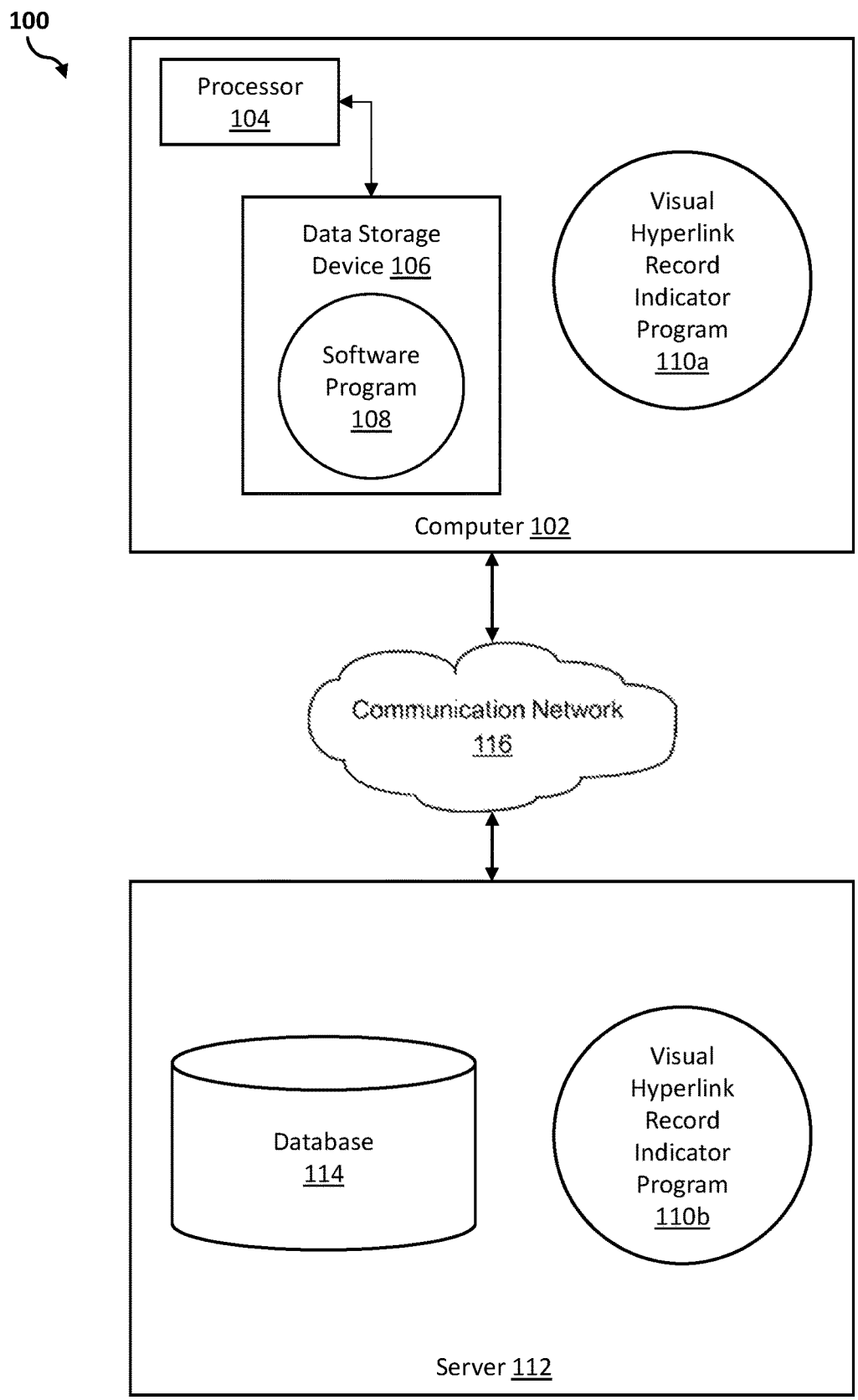
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for a visual hyperlink record indicator. As such, the present embodiment has the capacity to improve the technical field of data management by determining if a received hyperlink can be referenced to any system(s) associated with a user (i.e., user system(s)) and if so, modifying the received hyperlink to visually indicate the existence of a record of the received hyperlink within the user system(s). In embodiments, the received hyperlink may be modified using color, iconography, and/or other suitable visual markers to indicate the record of the received hyperlink including the received hyperlink data accumulated from the user system(s). The present embodiment also provides a way to modify the received hyperlink to enable visual mapping of the received hyperlink between multiple user devices and locations in the user system(s).

More specifically, a data structure may be maintained including a baseline inventory of content references or hyperlinks that are stored within the user system(s), cataloging the data and associated metadata pertaining to a device reference, a location reference, a usage history reference, a social reference, and any user specified reference of each hyperlink. When an identified user device of the user system(s) receives or is provided with a hyperlink, the data structure storing a repository of hyperlink records associated with the user system(s) may be searched to identify a record of the received hyperlink. If a record of the received hyperlink can be referenced to the user system(s), the received hyperlink may be dynamically modified to visually indicate the storage location (e.g., folder path), usage history, and any other accumulated data associated with the record of the received hyperlink. However, if a record of the received hyperlink cannot be referenced to the user system(s), the unmodified hyperlink (e.g., no change in color, no added icons) may be displayed on the user device. Following either event, the engagement between the user device and the received hyperlink may be tracked in order to manage the content markers or visual modifiers associated with the hyperlink record over time, as the user saves, bookmarks, modifies, and/or deletes the hyperlink reference on the user system(s). Furthermore, the data structure storing the repository of hyperlink records associated with the user system(s) may be updated to record any changes to hyperlink references and incorporate the preferred methods of engagement with hyperlinks over time, such that commonly accessed hyperlink references may be prioritized and visualized appropriately.

As described previously, communication, collaboration, and content sharing are important aspects of today's interconnected world. Due to the resulting volume of data and information accessible to a user, the user may experience difficulty recalling prior interactions with a presented content. Unable to recall this information, the user may bookmark or save multiple copies of the same content on the local user system or scattered throughout multiple user systems. In addition to data management and storage issues, the inability of the user to recall prior interactions with a presented content may lead to inefficient duplication of work.

Therefore, it may be advantageous to, among other things, provide a way to determine any prior interactions and usage history a user may have had with a given hyperlink and provide a way to modify the given hyperlink using one or more visual indicators that will quickly and efficiently identify the prior user interactions and usage history with the given hyperlink as well as identify the existence and location of the given hyperlink.

According to at least one embodiment, the visual hyperlink record indicator program may generate a data structure to maintain a baseline inventory of all or a portion of hyperlinks that are stored within the user system(s). Specifically, the data structure may include a catalog of the hyperlinks with associated references to the device and location (e.g., folder, etc.) of each hyperlink. The data structure may also contain hyperlink usage history indicating, for example, the date(s) when the hyperlink was accessed, duration of time at the hyperlinked content, referral path to hyperlink (e.g., direct click, blog, forum, e-mail), and immediate path after hyperlink (e.g., pseudo path crawling).

The present embodiment may include receiving a hyperlink and searching the data structure storing the repository of hyperlink records associated with the user system(s) to identify any record of prior interactions or usage history (e.g., through viewing, reviewing, bookmarking, saving) with the received hyperlink. If the received hyperlink cannot be referenced to the user system(s), no visual changes may be applied to the received hyperlink as the hyperlink is presented on the user device. However, if the received hyperlink can be referenced to the user system(s), one or more dynamic visual modifications may be applied to the received hyperlink as the hyperlink is presented on the user device.

In exemplary embodiments, visual markers may be dynamically applied to the received hyperlink based on potential references to various categories, such as, location reference, usage history reference, device reference, social reference, and any user specified reference. The reference categories may not be mutually exclusive, and a given hyperlink may be associated with multiple reference categories. Each applicable reference category may be depicted by a distinct color and/or by visual indicators such as icons. According to at least one embodiment, the visual hyperlink record indicator program may determine the color of the resulting hyperlink based on the most prevalent reference category. In at least one embodiment, the visual hyperlink record indicator program may concatenate multiple icons to the resulting hyperlink based on the applicable reference categories.

The present embodiment may include an iterative learning system that may learn the preferred methods of user engagement with hyperlinks over time. As such, the iterative learning system may prioritize and visualize the more commonly accessed hyperlinks appropriately.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a visual hyperlink record indicator program 110a. The networked computer environment 100 may also include a server 112 that is enabled to run a visual hyperlink record indicator program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communication network 116. The communication network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the visual hyperlink record indicator program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the visual hyperlink record indicator program 110a, 110b (respectively) to determine if a record of a received hyperlink can be referenced to the user system(s). The visual hyperlink record indicator program 110a, 110b may also provide a visual mapping of the record of the received hyperlink between multiple user devices and locations. The visual hyperlink record indication method is explained in more detail below with respect to FIG. 2.

Figure 2:
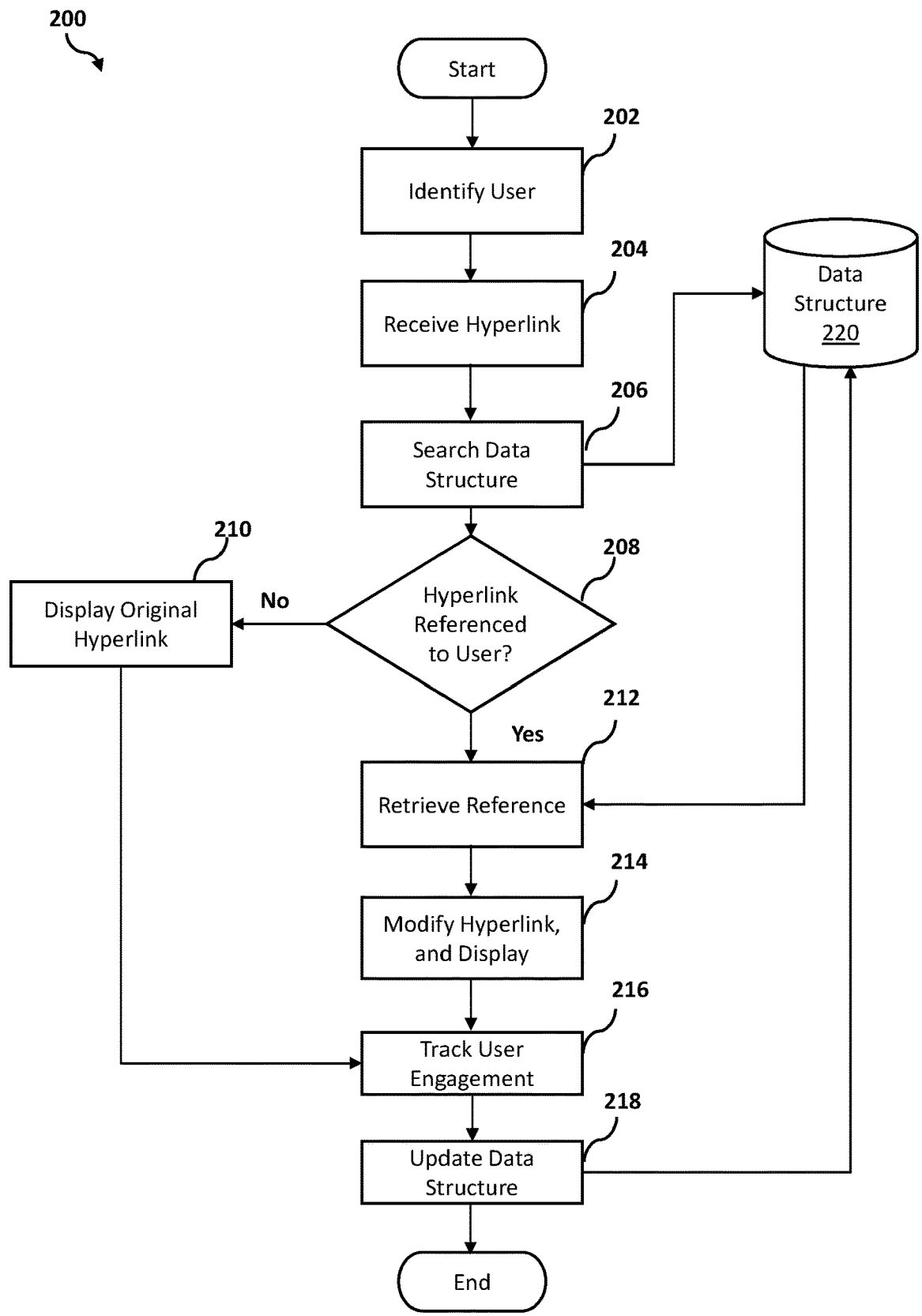
FIG. 2 is an operational flowchart illustrating a process for visually indicating a record associated with a hyperlink according to at least one embodiment.

Referring now to FIG. 2, an operational flowchart illustrating the exemplary visual hyperlink record indication process 200 used by the visual hyperlink record indicator program 110a and 110b according to at least one embodiment is depicted.

At 202 a user is identified. The visual hyperlink record indicator program 110a, 110b may identify the user by associating the user device (e.g., client computer 102) with a user profile corresponding with the user system(s), where the user system(s) may include one or more user devices and one or more collaborative environments in which the user is a team member.

The user profile may be initialized using one or more known methods and uploaded to a cloud environment for storage on a server 112 via a communication network 116. On the server 112, the user profile may be stored within a data repository, such as a database 114. After the user profile is initialized, the identified user profile may grant the visual hyperlink record indicator program 110a, 110b the requisite permissions to crawl the user system(s) to retrieve data and metadata pertaining to all or a portion of the hyperlink references (e.g., bookmarked hyperlinks) stored within the user system(s). The visual hyperlink record indicator program 110a, 110b may generate and maintain a data structure 220 including a repository of the hyperlink references retrieved from the user system(s). According to one embodiment, the visual hyperlink record indicator program 110a, 110b may also perform and maintain an inventory of the location reference, usage history reference, device reference, social reference, and any user-defined reference of each hyperlink in the repository of hyperlink references stored in data structure 220. The repository of hyperlink references in the data structure 220 may be indexed or categorized by the hyperlink address or one of the reference categories noted above. In embodiments, data structure 220 may be stored on server 112. In at least one embodiment, data structure 220 may be stored within database 114 on server 112.

The user profile may be linked to, or include pointers to, the repository of hyperlinks maintained within data structure 220. According to one embodiment, data structure 220 may be specific to an individual user profile. In one particular embodiment, data structure 220 may be centralized for multiple user profiles working in a collaborative environment (e.g., team work space). In at least one other embodiment, data structure 220 may be centralized for multiple user profiles and may include partitions for storing the repository of hyperlinks specific to the respective user profile.

In embodiments, the user profile may include a user-defined identifier (e.g., username, e-mail address) and one or more user-defined security measures (e.g., passwords/passphrases, finger print scanner) to prevent unauthorized access to the data structure 220 linked to the user profile. In addition, the user profile may include one or more user preferences regarding user engagement with the visual hyperlink record indicator program 110a, 110b, data structure 220, and hyperlinks received by the user device.

The visual hyperlink record indicator program 110a, 110b may associate the user device with the user profile by prompting (e.g., via dialog box) the user to enter the user-defined identifier and the user-defined security measure. The prompt of the visual hyperlink record indicator program 110a, 110b may also include an option for the user to initialize a new user profile if the user is not a return user. Once the user device is associated with the user profile, the visual hyperlink record indicator program 110a, 110b running on the user device may exchange certificates, keys, and/or other electronic credentials with server 112 to gain access to data structure 220 associated with the user profile.

For example, a user may interact with a laptop and start the visual hyperlink record indicator program 110a, 110b. The visual hyperlink record indicator program 110a, 110b may automatically present the user with a dialog box including an option to log into a user profile (e.g., via entering text) and/or an option to create a new user profile (e.g., via clicking new user button). The user may reply by textually entering the e-mail address and password associated with the user's profile. Once the visual hyperlink record indicator program 110a, 110b verifies the reply entered by the user, the visual hyperlink record indicator program 110a, 110b may exchange electronic credentials with server 112 and gain access to data structure 220 associated with the user profile.

Next, at 204, a hyperlink is received. The visual hyperlink record indicator program 110a, 110b, which is running on the user device may receive the hyperlink address. A sender may transmit the hyperlink, via communication network 116, to the user device during internet communication (e.g., e-mail, instant messaging) between the user and the sender. The user device may display the received hyperlink to the user via a user device display (e.g., via the laptop monitor).

Continuing the previous example, if a user running the visual hyperlink record indicator program 110a, 110b on the user device receives an e-mail from a sender, where the e-mail includes a hyperlink to "https://www.ibm.com/developerworks/," the visual hyperlink record indicator program 110a, 110b may detect the hyperlink in the e-mail, and identify the hyperlink address to be "https://www.ibm.com/developerworks/."

Then, at 206, the data structure 220 is searched. In response to receiving the hyperlink on the user device, the visual hyperlink record indicator program 110a, 110b running on the user device may search the data structure 220 to identify a record of the received hyperlink stored in the data structure 220. The visual hyperlink record indicator program 110a, 110b may transmit a request, via communication network 116, to search for the received hyperlink address within the repository of hyperlinks stored in the data structure 220. According to one embodiment, the visual hyperlink record indicator program 110a, 110b may compare the received hyperlink address against the repository of hyperlinks stored in the data structure 220 to identify a match between the received hyperlink address and a hyperlink address in the repository of hyperlinks stored in the data structure 220.

Continuing the previous example, the visual hyperlink record indicator program 110a, 110b may transmit a request via communication network 116 to identify a record of the received hyperlink address, "https://www.ibm.com/developerworks/," in the repository of hyperlinks stored in the data structure 220.

Then, at 208, the visual hyperlink record indicator program 110a, 110b determines if the received hyperlink can be referenced to the user system(s) associated with the user profile. The received hyperlink may be referenced to the user system(s) if the search request of data structure 220 at 206 yields a record of the received hyperlink. The data structure 220 may be searched by comparing the received hyperlink against the repository of hyperlinks stored in data structure 220 to find a match.

If the visual hyperlink record indicator program 110a, 110b determines that the received hyperlink is not referenced to the user system(s) at 208, then the visual hyperlink record indicator program 110a, 110b will visually render the received hyperlink, unchanged, in the original form at 210. The visual hyperlink record indicator program 110a, 110b may not modify the received hyperlink. According to one embodiment, the visual hyperlink record indicator program 110a, 110b may render the original visual form of the received hyperlink to be displayed on the user device display.

Continuing the previous example, if the visual hyperlink record indicator program 110a, 110b does not identify the received hyperlink address in the repository of hyperlinks stored in the data structure 220, the visual hyperlink record indicator program 110a, 110b may determine that the received hyperlink is not referenced to the user system(s). Thereafter, the visual hyperlink record indicator program 110a, 110b may render the received hyperlink address to be displayed on the user device display in the visual form in which the hyperlink address was received by the user device.

If, however, the visual hyperlink record indicator program 110a, 110b determines that the received hyperlink is referenced to the user system(s) at 208, then the visual hyperlink record indicator program 110a, 110b will retrieve the record of the received hyperlink from the data structure 220 at 212. According to one embodiment, the visual hyperlink record indicator program 110a, 110b may transmit a request, via communication network 116, to retrieve the record of the received hyperlink from the data structure 220. The visual hyperlink record indicator program 110a, 110b may retrieve the record of the received hyperlink in order to modify the received hyperlink to visually indicate, via the user device display, that the received hyperlink can be referenced to the user system(s), as further detailed below.

Each hyperlink in the repository of hyperlinks stored in the data structure 220 may be referenced to the user system(s) on the basis of one or more reference categories. The reference categories may include, for example, location reference, usage history reference, device reference, social reference, and any user specified reference. The reference categories may not be mutually exclusive, and a given hyperlink may be associated with multiple reference categories. Accordingly, the visual hyperlink record indicator program 110a, 110b may tag each hyperlink in the repository of hyperlinks under one or more reference categories.

According to at least one embodiment, a location reference may indicate, for example, which browser application/browser folder the hyperlink may be stored within. A usage history reference may indicate, for example, date(s) when the hyperlink was accessed, duration of time at the hyperlink, how the hyperlink was accessed (e.g., direct click from search engine), and what the user accessed immediately after the hyperlink was accessed (e.g., from credit card website to bank website). A device reference may indicate, for example, the user device(s) that may be storing the hyperlink. A social reference may indicate, for example, the social communication platform(s) (e.g., e-mail, instant messaging) through which the user received the hyperlink. In another embodiment, the social reference may also indicate the names and/or number of people who may have shared the hyperlink with the user and/or who may have bookmarked the hyperlink on their respective system(s). In at least one other embodiment, the social reference may also indicate the age of a bookmarked hyperlink, the rate of propagation of a bookmarked hyperlink, and a value assessment of the bookmarked hyperlink. A user specified reference may indicate any pre-defined preference, for example, a reminder to execute a specific task associated with the hyperlink.

Continuing the previous example, after the visual hyperlink record indicator program 110a, 110b determines that the received hyperlink may be referenced to the user system(s), the visual hyperlink record indicator program 110a, 110b may retrieve the record of the received hyperlink from data structure 220 and determine that the record of the received hyperlink includes tags for two references—a location reference and a device reference—to the user system(s).

Next, at 214, the received hyperlink is modified, and the modified hyperlink is displayed for the user. The visual hyperlink record indicator program 110a, 110b may dynamically modify the received hyperlink—by applying a color to the hyperlink address and/or by appending one or more iconic symbols proximate the hyperlink address—based on the applicable reference categories (e.g., location reference, usage history reference, device reference, social reference, and any user specified reference) tagged to the record of the received hyperlink in the data structure 220. After the visual hyperlink record indicator program 110a, 110b applies one or more modifications to the received hyperlink at 214, the visual hyperlink record indicator program 110a, 110b may render the modifications to be visible to the user via the user device display.

The visual hyperlink record indicator program 110a, 110b may dynamically modify the color of the received hyperlink to indicate that the record of the received hyperlink includes a location reference, a history reference, a device reference, a social reference, or any user specified reference. According to one embodiment, the visual hyperlink record indicator program 110a, 110b may include a default color palette from which each reference category may be associated with a distinct default color. The visual hyperlink record indicator program 110a, 110b may also provide an option for a user-defined color palette from which each reference category may be associated with a distinct user-defined color. The visual hyperlink record indicator program 110a, 110b may store the default color palette and any user-defined color palette in the data structure 220 as a user preference associated with the user profile.

Continuing the previous example, the visual hyperlink record indicator program 110a, 110b may provide the user with the option to define, such as via entering text or selecting from a list, a user-defined color palette. In response, the user may select from a list of colors to define that the location reference be indicated by orange, the usage history reference be indicated by green, the device reference be indicated by blue, the social reference be indicated by turquoise, and the user specified reference be indicated by purple. The visual hyperlink record indicator program 110a, 110b may then store the user-defined color palette in the data structure 220 with the user profile.

According to one embodiment, the visual hyperlink record indicator program 110a, 110b may apply one color to the received hyperlink address. As such, the visual hyperlink record indicator program 110a, 110b may apply a color to indicate the most prevalent reference category based on learning the user preferences and/or tracking the user engagement with respect to hyperlink interactions. Continuing the previous example, the visual hyperlink record indicator program 110a, 110b may determine that a received hyperlink includes a location reference and a device reference to the user system(s). Additionally, the visual hyperlink record indicator program 110a, 110b may identify the user-defined preference for location data. As such, the visual hyperlink record indicator program 110a, 110b may modify the color of the received hyperlink to orange to indicate the location reference in accordance with the user-defined preference for location reference data.

Additionally, or alternatively, the visual hyperlink record indicator program 110a, 110b may dynamically modify the received hyperlink by adding visual indicators such as icons proximate the received hyperlink address to indicate the applicable reference categories tagged to the record of the received hyperlink in data structure 220. In one embodiment, the visual hyperlink record indicator program 110a, 110b may concatenate multiple icons to the received hyperlink address when multiple reference categories may be tagged to the record of the received hyperlink.

Data structure 220 may include a table listing the various reference categories and the associated icons. According to one embodiment, the visual hyperlink record indicator program 110a, 110b may set default icons for each reference category. The visual hyperlink record indicator program 110a, 110b may also provide an option for a user-defined set of icons where the user may choose the icons for each reference category. The user-defined set of icons may be selected from a list of icons which the visual hyperlink record indicator program 110a, 110b may provide to the user or the visual hyperlink record indicator program 110a, 110b may include an option for the user to upload icon image files via the user device. The visual hyperlink record indicator program 110a, 110b may store the user-defined set of icons in the data structure 220 as a user preference associated with the user profile.

Continuing the previous example, the visual hyperlink record indicator program 110a, 110b may determine that the record of the received hyperlink includes a device reference to the user system(s), and specifically that the received hyperlink is stored in a mobile device, a personal cloud system, and a work shared cloud system associated with the user profile. The visual hyperlink record indicator program 110a, 110b may also identify that the user profile does not include a user-defined set of icons. Accordingly, the visual hyperlink record indicator program 110a, 110b may retrieve the default device reference icons from the data structure 220 via communication network 116 and concatenate the applicable icons proximate the received hyperlink address.

In at least one embodiment, the visual hyperlink record indicator program 110a, 110b may use the icons to map out the device and system location of the received hyperlink. Based on the mapping information provided by the visual hyperlink record indicator program 110a, 110b, the user may decide not to bookmark the received hyperlink to avoid duplicate storage of the same hyperlink. The user may also utilize the mapping information provided by the visual hyperlink record indicator program 110a, 110b to maintain one copy of the received hyperlink and eliminate the remaining duplicate copies of the received hyperlink. Thus, visual hyperlink record indicator program 110a, 110b may provide the mapping information to quickly and efficiently identify the device and location of the received hyperlink and may provide the user with the option to eliminate redundant storage of duplicate hyperlinks, thereby improving the operation efficiency of the user system(s) and reducing data storage costs across the user system(s).

In exemplary embodiments, the visual hyperlink record indicator program 110a, 110b may dynamically modify the received hyperlink such that the modified hyperlink (e.g., via color, icons) may be visible on the user device display in response to digitally pointing (e.g., via mouse-over or hover function) to the received hyperlink using a digital pointer or user input device (e.g., computer mouse, stylus). Continuing the previous example, in response to the user digitally pointing to the received hyperlink with a computer mouse cursor, the visual hyperlink record indicator program 110a, 110b may be triggered to change the color of the received hyperlink to orange and/or concatenate the applicable device reference icons proximate the received hyperlink address.

In one embodiment, the visual hyperlink record indicator program 110a, 110b may dynamically modify the received hyperlink such that the applicable reference categories of the received hyperlink may be indicated via a floating text box or a new window in response to digitally pointing to the received hyperlink using the user input device. Continuing the previous example, in response to the user digitally pointing to the received hyperlink with a computer mouse cursor, the visual hyperlink record indicator program 110a, 110b may be triggered to open a floating text box displaying: "Location: Browser—Work Folder; History: Last Opened May 9, 2018; Device: Work Mobile, Personal Tablet."

According to another embodiment, the visual hyperlink record indicator program 110a, 110b may dynamically modify the received hyperlink such that the icons (e.g., a red pin symbol for location reference) attached to the modified hyperlink address may provide further information (e.g., via floating text box) about the associated reference category in response to digitally pointing to the icons attached to the modified hyperlink using the user input device. Continuing the previous example, in response to the user digitally pointing to a red pin symbol rendered adjacent to the received hyperlink address, the visual hyperlink record indicator program 110a, 110b may be triggered to open a floating text box displaying: "Location: Browser—Work Folder."

According to at least one other embodiment, the visual hyperlink record indicator program 110a, 110b may dynamically modify the received hyperlink such that the modified hyperlink (e.g., via color, icons) may be continuously visible on the user device display.

After the visual hyperlink record indicator program 110a, 110b dynamically modifies the received hyperlink as detailed above, the visual hyperlink record indicator program 110a, 110b may visually render the modified hyperlink onto the user device display.

Continuing the previous example, the visual hyperlink record indicator program 110a, 110b may determine that the received hyperlink includes a device reference to the user system(s) and therefore may dynamically modify the received hyperlink by concatenating the associated mobile device icon and cloud system icon proximate the received hyperlink address. Thereafter, the visual hyperlink record indicator program 110a, 110b may visually render the mobile device icon image and the cloud system icon image onto the user device display proximate the received hyperlink address on the user device display.

If the visual hyperlink record indicator program 110a, 110b determined that the received hyperlink could not be referenced to the user system(s) at 208 and therefore displayed the unmodified hyperlink at 210, or after the visual hyperlink record indicator program 110a, 110b determined that the received hyperlink could be referenced to the user system(s) at 208 and therefore displayed the modified hyperlink at 214, the visual hyperlink record indicator program 110a, 110b will track the user engagement with the received hyperlink at 216.

In one embodiment, the visual hyperlink record indicator program 110a, 110b may track the user engagement with the received hyperlink by monitoring and measuring the user interactions with user input devices, such as, a computer keyboard, computer mouse, and stylus. The visual hyperlink record indicator program 110a, 110b may monitor and measure the user interactions with the user input devices to determine if the received hyperlink is saved, bookmarked, modified, or deleted on the user device. Based on monitoring and measuring the user engagement with the received hyperlink, the visual hyperlink record indicator program 110a, 110b may manage the reference categories and content markers associated with the record of the received hyperlink.

Continuing the previous example, the visual hyperlink record indicator program 110a, 110b running on the user device may receive a hyperlink which may not be referenced to the user system(s). By monitoring and measuring the user interactions with the keyboard and mouse of the user device, the visual hyperlink record indicator program 110a, 110b may determine that the received hyperlink is being saved in the "Browser—Work Folder" of the user device. In response, the visual hyperlink record indicator program 110a, 110b may generate a record of the received hyperlink and store the location reference in the repository of hyperlinks in the data structure 220. Thereafter, if the visual hyperlink record indicator program 110a, 110b running on the user device receives the same hyperlink, the visual hyperlink record indicator program 110a, 110b may identify the record of the received hyperlink and may modify the received hyperlink to indicate the location reference to the user's "Browser—Work Folder" of the user device.

In another embodiment, the visual hyperlink record indicator program 110a, 110b may track the user engagement with the received hyperlink (e.g., via saving, bookmarking, modifying) at 216 to maintain an iterative learning system for learning the preferred user engagement methods with hyperlinks over time. The visual hyperlink record indicator program 110a, 110b may learn the preferred user engagement methods with hyperlinks by monitoring and measuring the user interactions with the user input devices of the user system(s).

Continuing the previous example, over the span of one year, the visual hyperlink record indicator program 110a, 110b running on multiple user devices of the user system(s) may monitor and measure the user interactions with the keyboard and mouse of the user work laptop and may learn that the user prefers to save work-related hyperlinks on the user work laptop. Thereafter, if the visual hyperlink record indicator program 110a, 110b running on the user work laptop receives a work-related hyperlink via e-mail and the received work-related hyperlink is already saved on the user mobile device, the visual hyperlink record indicator program 110a, 110b may identify the record of the received work-related hyperlink and may modify the received work-related hyperlink by appending an icon to the received hyperlink to indicate that the received hyperlink is already saved on the user mobile device. Furthermore, the visual hyperlink record indicator program 110a, 110b may identify the user preference for saving work-related hyperlinks on the user work laptop and may provide the user with the option to save the received work-related hyperlink on the user work laptop. Additionally, the visual hyperlink record indicator program 110a, 110b may provide the user with the option to delete the received work-related hyperlink from the user mobile device to reduce duplicate content storage on the user system(s).

In another embodiment, the visual hyperlink record indicator program 110a, 110b may track (e.g., via monitoring and measuring the user interactions with the user device) the user engagement with the received hyperlink at 216 to maintain the iterative learning system for learning the user preferred hyperlink modifier(s) (e.g., color, icons, mouse-over or hover function). Continuing the previous example, the visual hyperlink record indicator program 110a, 110b running on the user device may monitor and measure the user interactions with the keyboard and mouse of the user device and may learn that the user prefers icons to indicate the record of the received hyperlink reference. Thereafter, the visual hyperlink record indicator program 110a, 110b may identify icons as the user preferred hyperlink modifier and add icons to received hyperlinks when indicating the record of the received hyperlink reference.

In another embodiment, the visual hyperlink record indicator program 110a, 110b may track (e.g., via monitoring and measuring the user interactions with the user device) the user engagement with the received hyperlink at 216 to maintain the iterative learning system for learning the user preferred reference category (e.g., location reference, usage history reference, device reference, social reference) and prioritize the hyperlink modifier to highlight and provide detailed information on the user preferred reference category.

Continuing the previous example, over the span of one year, the visual hyperlink record indicator program 110a, 110b running on multiple user devices across the user system(s) may monitor and measure the user interactions with the user devices and may learn that the user preferred reference category is the social reference category. Thereafter, if the visual hyperlink record indicator program 110a, 110b determines that a received hyperlink includes a location reference, a device reference, and a social reference to the user system(s), the visual hyperlink record indicator program 110a, 110b may modify the received hyperlink by adding icons to indicate the location, device, and social references. Additionally, the visual hyperlink record indicator program 110a, 110b may identify the user preference for the social reference category and may further highlight the social reference category of the received hyperlink by modifying the color of the received hyperlink to a color indicative of the social reference. The visual hyperlink record indicator program 110a, 110b may also provide a floating text box with detailed social reference data, such as the number and/or names of people who may have previously shared the received hyperlink with the user, the rate at which the received hyperlink is being propagated among other users, and a value assessment of the received hyperlink to help the user decide if the received hyperlink should be saved to the user system(s).

Then at 218, data structure 220 is updated. The visual hyperlink record indicator program 110a, 110b may communicate with data structure 220 via communication network 116 and may update the repository of hyperlinks stored in the data structure 220 to reflect the information gathered from tracking the user engagement at 216. Continuing the previous example, if the user receives a hyperlink and saves the received hyperlink to the "Browser—Work Folder" on the user work laptop, the visual hyperlink record indicator program 110a, 110b may detect (e.g., via monitoring and measuring the user interactions with the user device) that the user saved the received hyperlink and may communicate with data structure 220 via communication network 116 to update the record of the received hyperlink to include a location reference to the "Browser—Work Folder" of the user work laptop. According to one embodiment, the visual hyperlink record indicator program 110a, 110b may also update the data structure 220 to include the user engagement preferences learned from tracking the user engagement with hyperlinks over time.

In another embodiment involving a team (e.g., multiple users) working within a collaborative environment, the visual hyperlink record indicator program 110a, 110b may retrieve the hyperlink references stored in a collaborative environment (e.g., work cloud system) and maintain an inventory of the retrieved hyperlink references in the data structure 220. As such, when the visual hyperlink record indicator program 110a, 110b running on a member user device receives a hyperlink, the visual hyperlink record indicator program 110a, 110b may search through the data structure 220 to determine if the received hyperlink may be referenced to the collaborative environment (e.g., work cloud system). In at least one embodiment, the visual hyperlink record indicator program 110a, 110b running on each member user device may be independently configurable to modify received hyperlinks (e.g., via color, icons, mouse-over or hover function) based on respective member user preferences. Continuing the previous example, the visual hyperlink record indicator program 110a, 110b running on a first member user device may be set to modify the received hyperlinks to display icons in response to digitally pointing to the received hyperlink address with a computer mouse, whereas the visual hyperlink record indicator program 110a, 110b running on a second member user device may be set to modify the received hyperlinks to continuously display the icons proximate the received hyperlink address.

In another embodiment, the visual hyperlink record indicator program 110a, 110b may include an option to identify and retrieve the record of received hyperlink references from decentralized data structures or sources when the visual hyperlink record indicator program 110a, 110b running on the user device receives a hyperlink. In such embodiments, the data structure 220 may not include a centralized repository of hyperlink references retrieved from the user system(s). Instead, the hyperlink references pertaining to each reference category detailed above (e.g., location reference, device reference, social reference, usage history reference) may be stored in multiple data sources across the user system(s) and the visual hyperlink record indicator program 110a, 110b may access the multiple data sources to identify and retrieve the record of the received hyperlink.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
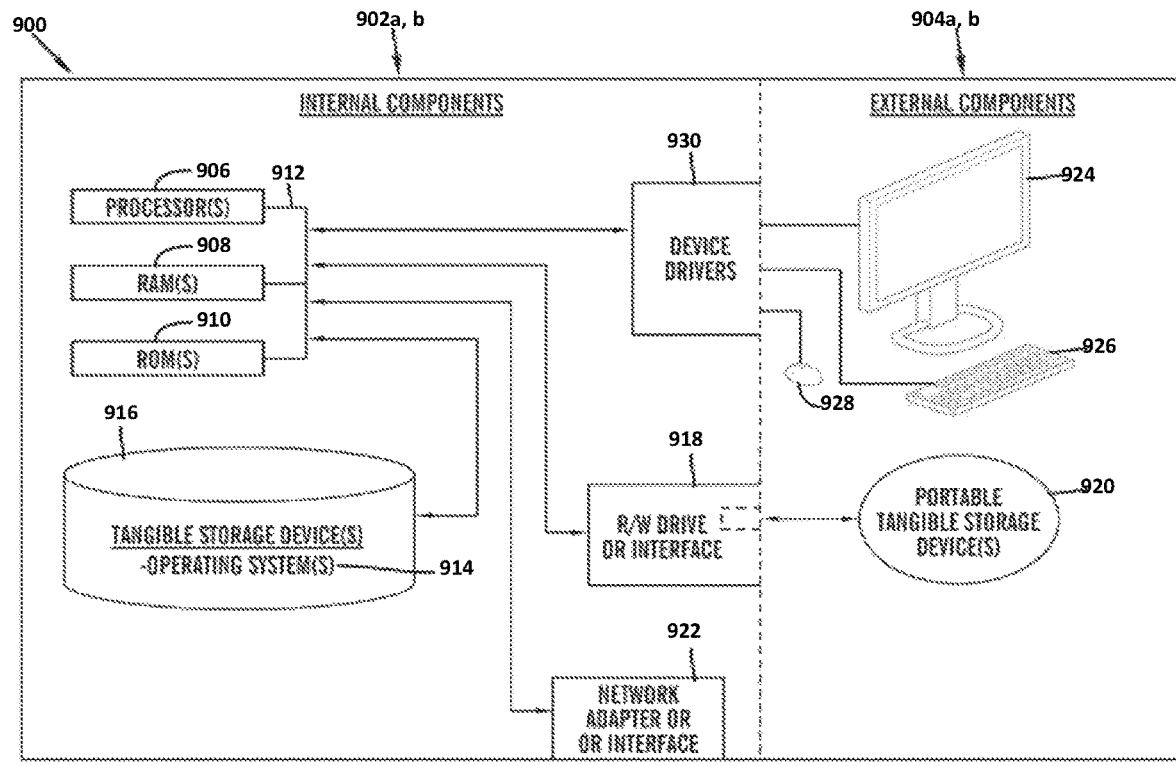
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the visual hyperlink record indicator program 110a in client computer 102, and the visual hyperlink record indicator program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the visual hyperlink record indicator program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the visual hyperlink record indicator program 110a in client computer 102 and the visual hyperlink record indicator program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the visual hyperlink record indicator program 110a in client computer 102 and the visual hyperlink record indicator program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
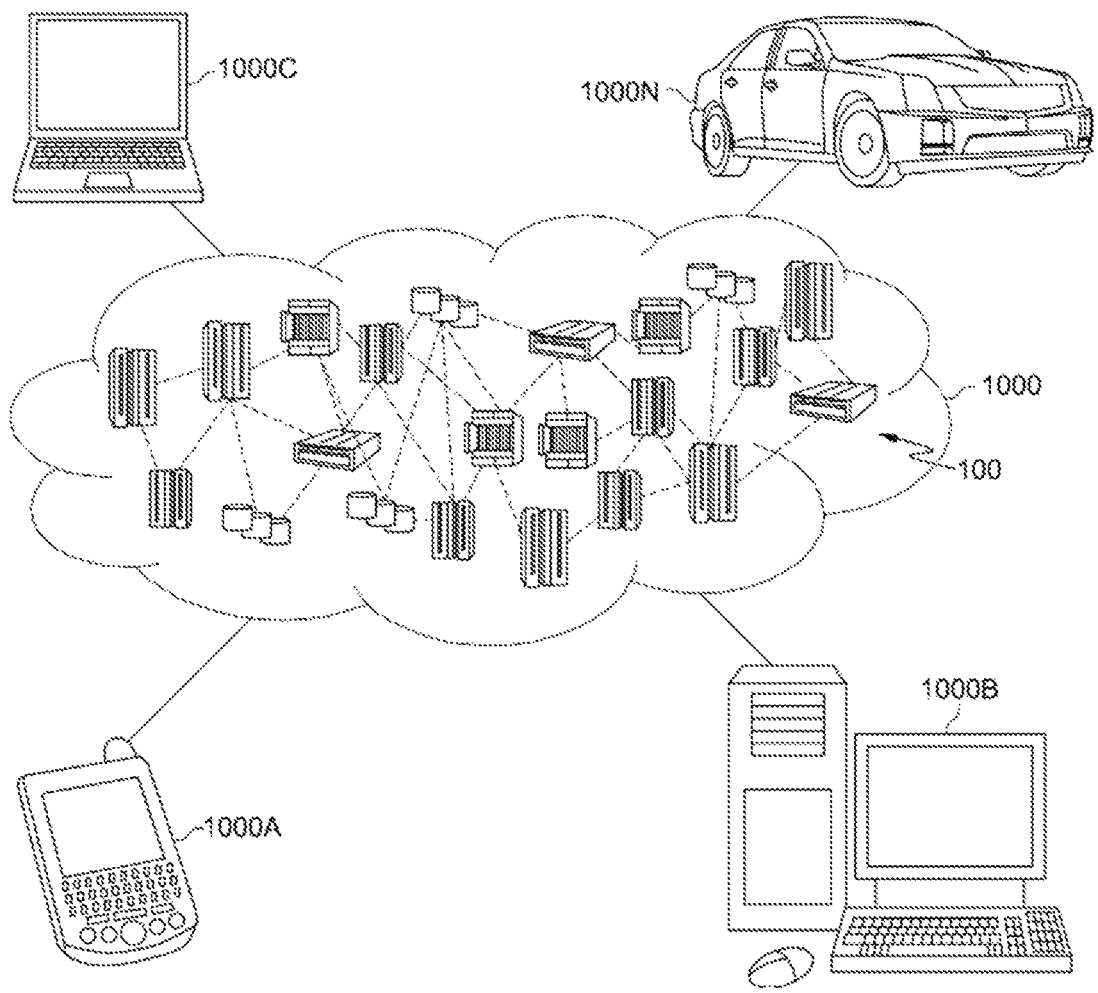
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
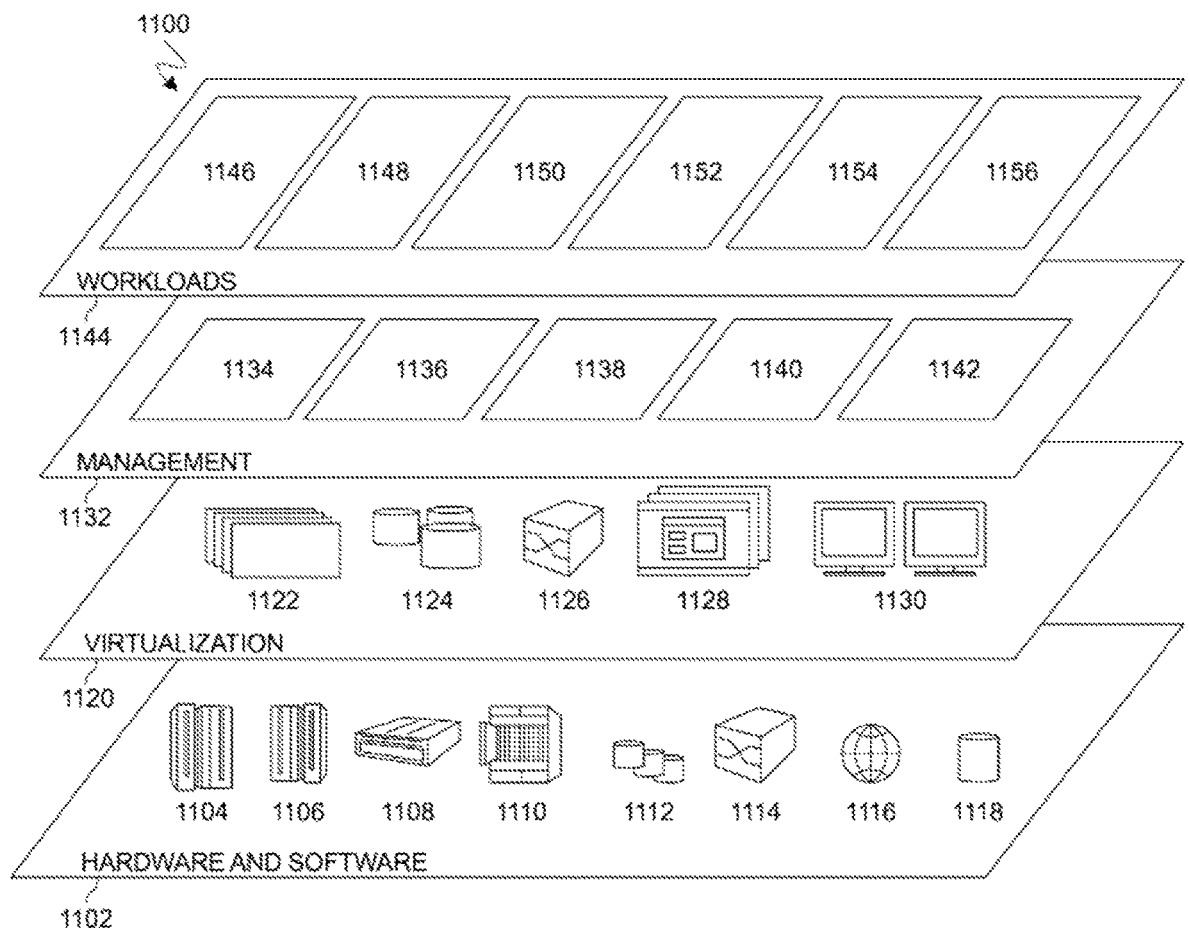
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture-based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized.

Examples of workloads and functions which may be provided from this layer include: mapping and navigation 1146; software development and lifecycle management 1148; virtual classroom education delivery 1150; data analytics processing 1152; transaction processing 1154; and hyperlink record indication 1156. A visual hyperlink record indicator program 110a, 110b provides a way to determine if a received hyperlink can be referenced to a user's system(s) and if so, modify the received hyperlink to visually indicate the existence of the received hyperlink's record within the user's system(s). A visual hyperlink record indicator program 110a, 110b also provides a way to map the received hyperlink's record between multiple user devices and locations using visual markers or identifiers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for indicating a hyperlink record, the method comprising:
   receiving, on a user device, a hyperlink included in an internet communication from a sender device;
   in response to receiving the hyperlink from the sender device, searching a data structure using the received hyperlink, the searched data structure including a repository of a plurality of hyperlinks stored in at least one user system, wherein each hyperlink in the repository of the plurality of hyperlinks includes a hyperlink record having at least one reference to the at least one user system;
   identifying a record of the received hyperlink in the searched data structure; and
   in response to identifying the record of the received hyperlink in the searched data structure, dynamically modifying the received hyperlink in the internet communication on the user device to indicate the at least one reference to the received hyperlink in the at least one user system.

2. The method of claim 1, further comprising displaying the modified hyperlink.

3. The method of claim 1, further comprising displaying the modified hyperlink in response pointing to the received hyperlink with a digital pointer.

4. The method of claim 1, further comprising:
   identifying a user;
   receiving permission to access the at least one user system associated with the identified user;
   retrieving a plurality of hyperlink data stored in the at least one user system associated with the identified user;
   generating the searched data structure including the repository of the plurality of hyperlinks incorporating the retrieved plurality of hyperlink data stored in the at least one user system associated with the identified user; and
   maintaining the generated data structure, wherein the at least one reference to the at least one user system is cataloged in the hyperlink record of each hyperlink in the repository of the plurality of hyperlinks.

5. The method of claim 1, wherein the at least one reference to the at least one user system comprises a hyperlink location reference, a hyperlink usage history reference, a hyperlink device reference, a hyperlink social reference, and a user specified hyperlink reference.

6. The method of claim 1, wherein modifying the received hyperlink is selected from the group consisting of changing a color associated with the received hyperlink and appending at least one icon proximate the received hyperlink.

7. The method of claim 4, further comprising mapping the received hyperlink to at least one of a plurality of devices and a plurality of locations associated with the at least one user system.

8. The method of claim 4, further comprising:
   tracking an engagement with the received hyperlink to identify at least one change associated with the at least one reference of the received hyperlink; and
   in response to identifying the at least one change associated with the at least one reference of the received hyperlink, updating the record of the received hyperlink in the maintained data structure to incorporate the at least one change to the at least one reference of the received hyperlink.

9. A computer system for indicating a hyperlink record, comprising:
   one or more processors, one or more computer-readable memories, one or more computer-readable tangible storage media, and program instructions stored on at least one of the one or more computer-readable tangible storage media for execution by at least one of the one or more processors via at least one of the one or more memories, wherein the computer system is capable of performing a method comprising:
   receiving, on a user device, a hyperlink included in an internet communication from a sender device;
   in response to receiving the hyperlink from the sender device, searching a data structure using the received hyperlink, the searched data structure including a repository of a plurality of hyperlinks stored in at least one user system, wherein each hyperlink in the repository of the plurality of hyperlinks includes a hyperlink record having at least one reference to the at least one user system;
   identifying a record of the received hyperlink in the searched data structure; and
   in response to identifying the record of the received hyperlink in the searched data structure, dynamically modifying the received hyperlink in the internet communication on the user device to indicate the at least one reference to the received hyperlink in the at least one user system.

10. The computer system of claim 9, further comprising displaying the modified hyperlink.

11. The computer system of claim 9, further comprising displaying the modified hyperlink in response pointing to the received hyperlink with a digital pointer.

12. The computer system of claim 9, further comprising:
   identifying a user;
   receiving permission to access the at least one user system associated with the identified user;
   retrieving a plurality of hyperlink data stored in the at least one user system associated with the identified user;
   generating the searched data structure including the repository of the plurality of hyperlinks incorporating the retrieved plurality of hyperlink data stored in the at least one user system associated with the identified user; and maintaining the generated data structure, wherein the at least one reference to the at least one user system is cataloged in the hyperlink record of each hyperlink in the repository of the plurality of hyperlinks.

13. The computer system of claim 9, wherein the at least one reference to the at least one user system comprises a hyperlink location reference, a hyperlink usage history reference, a hyperlink device reference, a hyperlink social reference, and a user specified hyperlink reference.

14. The computer system of claim 12, further comprising mapping the received hyperlink to at least one of a plurality of devices and a plurality of locations associated with the at least one user system.

15. The computer system of claim 12, further comprising:
tracking an engagement with the received hyperlink to identify at least one change associated with the at least one reference of the received hyperlink; and in response to identifying the at least one change associated with the at least one reference of the received hyperlink, updating the record of the received hyperlink in the maintained data structure to incorporate the at least one change to the at least one reference of the received hyperlink.

16. A computer program product for indicating a hyperlink record, comprising:
one or more computer-readable tangible storage media and program instructions stored on at least one of the one or more computer-readable tangible storage media, the program instructions executable by a processor to cause the processor to perform a method comprising:

receiving, on a user device, a hyperlink included in an internet communication from a sender device;

in response to receiving the hyperlink from the sender device, searching a data structure using the received hyperlink, the searched data structure including a repository of a plurality of hyperlinks stored in at least one user system, wherein each hyperlink in the repository of the plurality of hyperlinks includes a hyperlink record having at least one reference to the at least one user system;

identifying a record of the received hyperlink in the searched data structure; and in response to identifying the record of the received hyperlink in the searched data structure, dynamically modifying the received hyperlink in the internet communication on the user device to indicate the at least one reference to the received hyperlink in the at least one user system.

17. The computer program product of claim 16, further comprising displaying the modified hyperlink.

18. The computer program product of claim 16, further comprising displaying the modified hyperlink in response pointing to the received hyperlink with a digital pointer.

19. The computer program product of claim 16, further comprising:
identifying a user;
receiving permission to access the at least one user system associated with the identified user;
retrieving a plurality of hyperlink data stored in the at least one user system associated with the identified user;
generating the searched data structure including the repository of the plurality of hyperlinks incorporating the retrieved plurality of hyperlink data stored in the at least one user system associated with the identified user; and
maintaining the generated data structure, wherein the at least one reference to the at least one user system is cataloged in the hyperlink record of each hyperlink in the repository of the plurality of hyperlinks.

20. The computer program product of claim 19, further comprising mapping the received hyperlink to at least one of a plurality of devices and a plurality of locations associated with the at least one user system.

* * * * *